United States Patent [19]

Nilsson

[11] Patent Number: 4,991,364
[45] Date of Patent: Feb. 12, 1991

[54] GREENHOUSE ATTACHMENT
[75] Inventor: Finn Nilsson, Sherkston, Canada
[73] Assignee: Spacemaker Limited, Mississauga, Canada
[21] Appl. No.: 372,627
[22] Filed: Jun. 28, 1989
[51] Int. Cl.⁵ .............................................. E04B 1/32
[52] U.S. Cl. ........................................ 52/86; 52/732; 52/773; 52/775
[58] Field of Search ................... 52/86, 36, 772, 773, 52/775, 777, 732, 282, 732, 448, 484

[56] References Cited
U.S. PATENT DOCUMENTS

| | | | |
|---|---|---|---|
| 2,444,091 | 6/1948 | Carlsen | 52/732 X |
| 3,332,197 | 7/1967 | Hinkle | 52/732 X |
| 3,378,976 | 4/1968 | Meredith, Jr. | 52/484 X |
| 3,517,474 | 6/1970 | Lanternier | 52/732 |
| 3,778,947 | 12/1973 | Sauer | 52/484 X |
| 3,841,047 | 10/1974 | Zinn | 52/732 X |
| 4,010,591 | 3/1977 | Gross | 52/732 |
| 4,015,389 | 4/1977 | Thompson | 52/732 X |
| 4,040,758 | 8/1977 | Sauer | 52/484 X |
| 4,329,824 | 5/1982 | Lowe | 52/732 X |
| 4,335,547 | 6/1982 | Maxwell | 52/36 X |
| 4,520,609 | 6/1985 | Worley et al. | 52/484 X |
| 4,671,027 | 6/1987 | Esposito | 52/86 |
| 4,796,395 | 1/1989 | Israel | 52/86 |

Primary Examiner—David A. Scherbel
Assistant Examiner—Lan Mai

[57] ABSTRACT

A structural member can be used alone or paired with a like member for use as an upright or cross member of a support structure. This structural member has particular application in greenhouse structures where a support structure is formed for retaining transparent panels. The structural members are preferably made of rolled steel and are of a generally 'T' configuration with a pair of retaining flanges. The structure simplifies manufacturing by accommodating punching of various fastening ports or forming of securing flanges prior to the rolling operation. Any shaping of the members is easier as the shaping may be carried out on individual members prior to pairing of the members to form an upright or cross member.

14 Claims, 5 Drawing Sheets

GREENHOUSE ATTACHMENT

FIELD OF THE INVENTION

The present invention is directed to a rolled metal structural member and, in particular, is directed to a rolled structural member for use in greenhouse assemblies.

BACKGROUND OF THE INVENTION

Greenhouse assemblies have been known for many years and typically includes extruded aluminum members of various shapes for forming greenhouse structural members. In order to provide smooth curves, the aluminum members may be bent, however, as the cross sectional area of the upright members increase, bending becomes much more difficult and costly. In addition, most greehouse assemblies use a host of different extruded members and there remains a need for a simple more cost effective alternative.

SUMMARY OF THE INVENTION

According to the present invention, a rolled metal structural member comprises a generally T-shaped configuration, with one side of the T configuration having a pair of retaining flanges. The first retaining flange is located at one edge of the cross member of the 'T' configuration and is directed downwardly and inwardly. The base of the T configuration has to the side of the base opposite the first retaining flange an upwardly and outwardly extending retaining flange.

This structural member can advantageously be used on its own to form a component of the greenhouse assembly or it may be paired in back to back relationship with a like member for forming other structural members. This ability to pair the member simplifies defining a curved portion, as only half of the structural member needs to be bent in each step and thus, the press capacity for accomplishing this bending operation is reduced. Furthermore, the use of rolled steel in forming of the structural member allows various perforations to easily be made in the substrate before rolling and the tolerances of the rolling operation has proven acceptable.

It is also possible with the rolled metal structural members to die cut or bend various end portions to allow positive securement of the structural member to another structural member of the greenhouse assembly. Preferred securement uses a nut and bolt arrangement, such that slippage of the connection is reduced. Even if the bolt should loosen, there is still positive retention of the various members in their respective positions.

BRIEF DESCRIPTION OF THE DRAWINGS

Preferred embodiments of the invention are shown in the drawings, wherein.

DETAILED DESCRIPTION OF THE PREFERRED EMBODIMENTS

Figure 1:
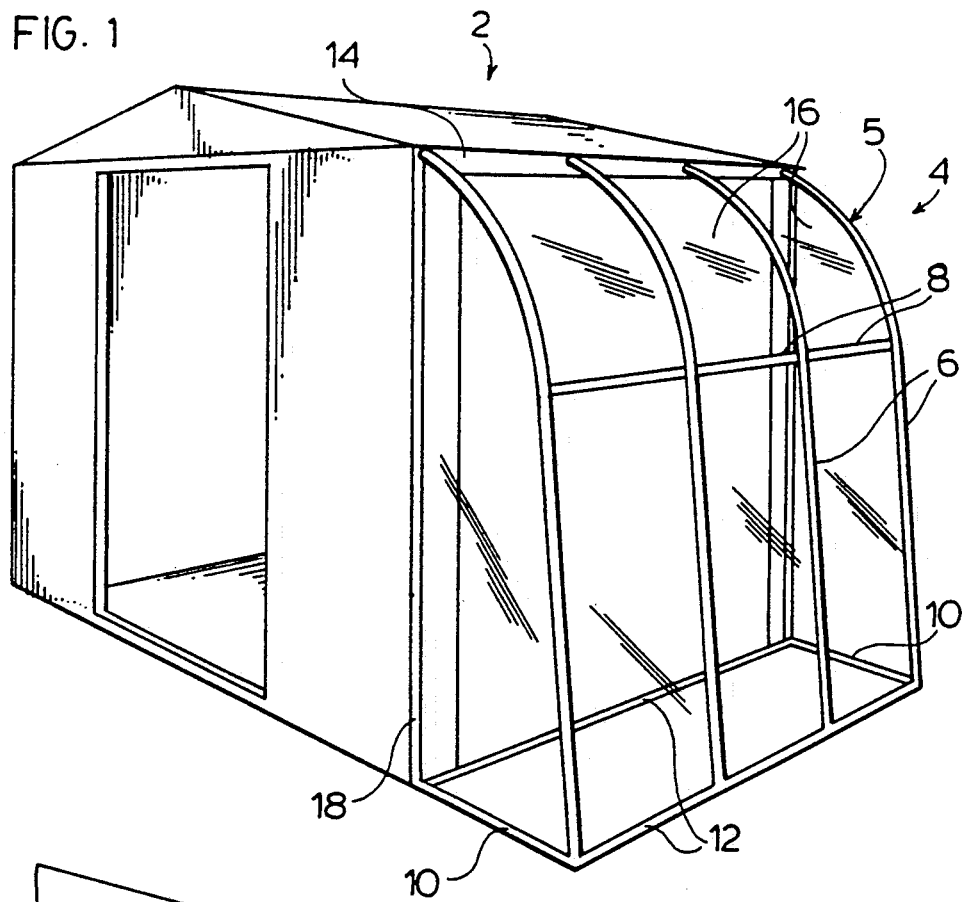
FIG. 1 is a perspective view of a greenhouse assembly attached to the side wall of a garden shed.

The garden shed generally shown as 2 can either be made of wood or metal (preferably steel) and has an open wall section to one side to which the greenhouse assembly 4 is attached. The greenhouse assembly 4 has a number of upright members 6 which include a curved upper portion, generally shown as 5. This curved upper portion has been bent in the length of the structural upright members 6 to form the curved portion in the plane of the top portion of the generally T configuration of the separate structural members 6a and 6b which form the upright members 6. The greenhouse assembly also includes a number of cross members 8 comprising paired components 8a and 8b, end members 10, bottom members 12, a header member 14, and a rear upright member 18. Plexiglas or other transparent panels 16 are retained within the framework defined by the various structural members by means of spring retaining clips 20 which engage with a retaining flange of the structural members.

Figure 3:
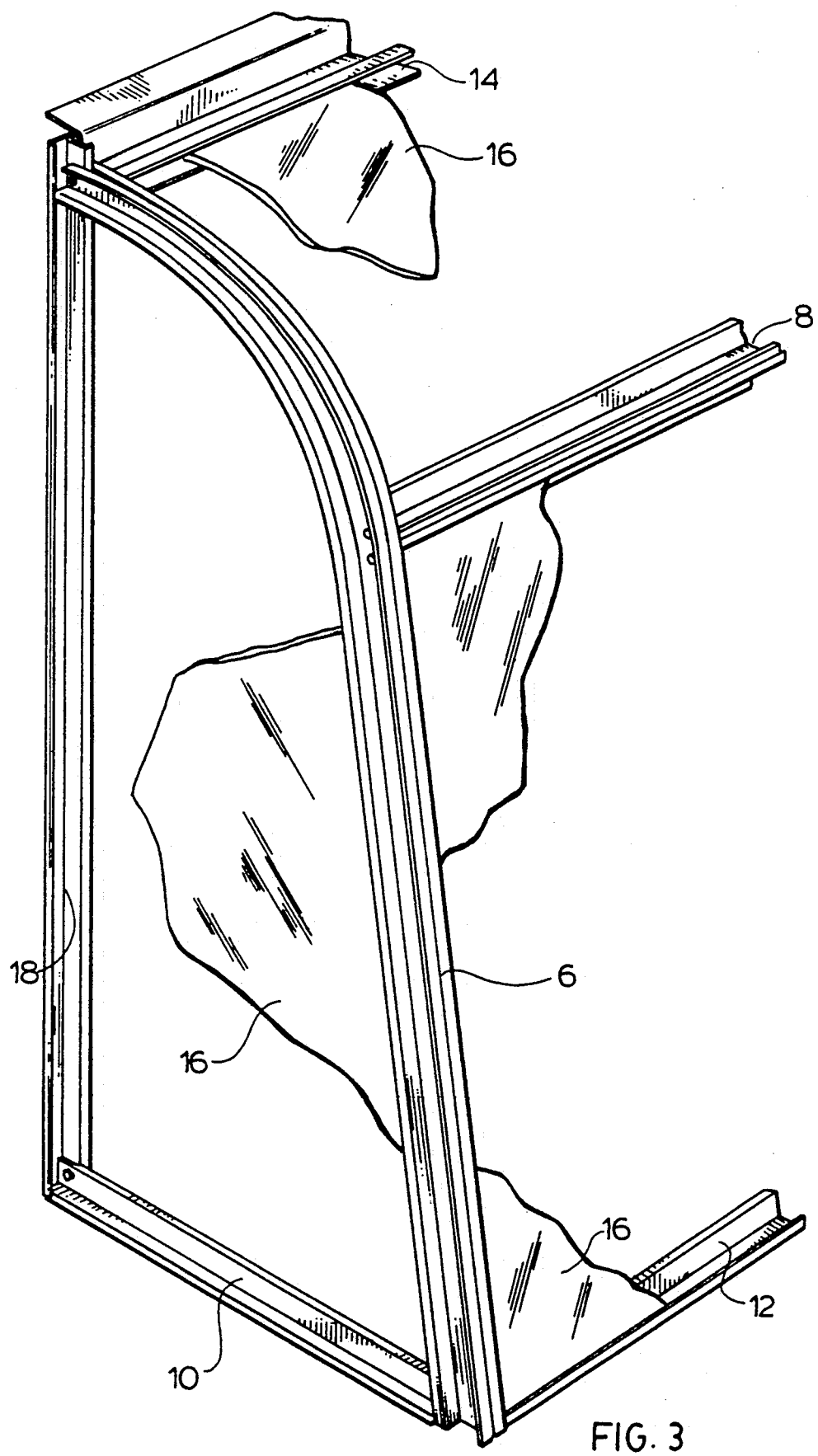
FIG. 3 is a partial perspective view showing connection of a number of the structural members of the greenhouse assembly.
Figure 4:
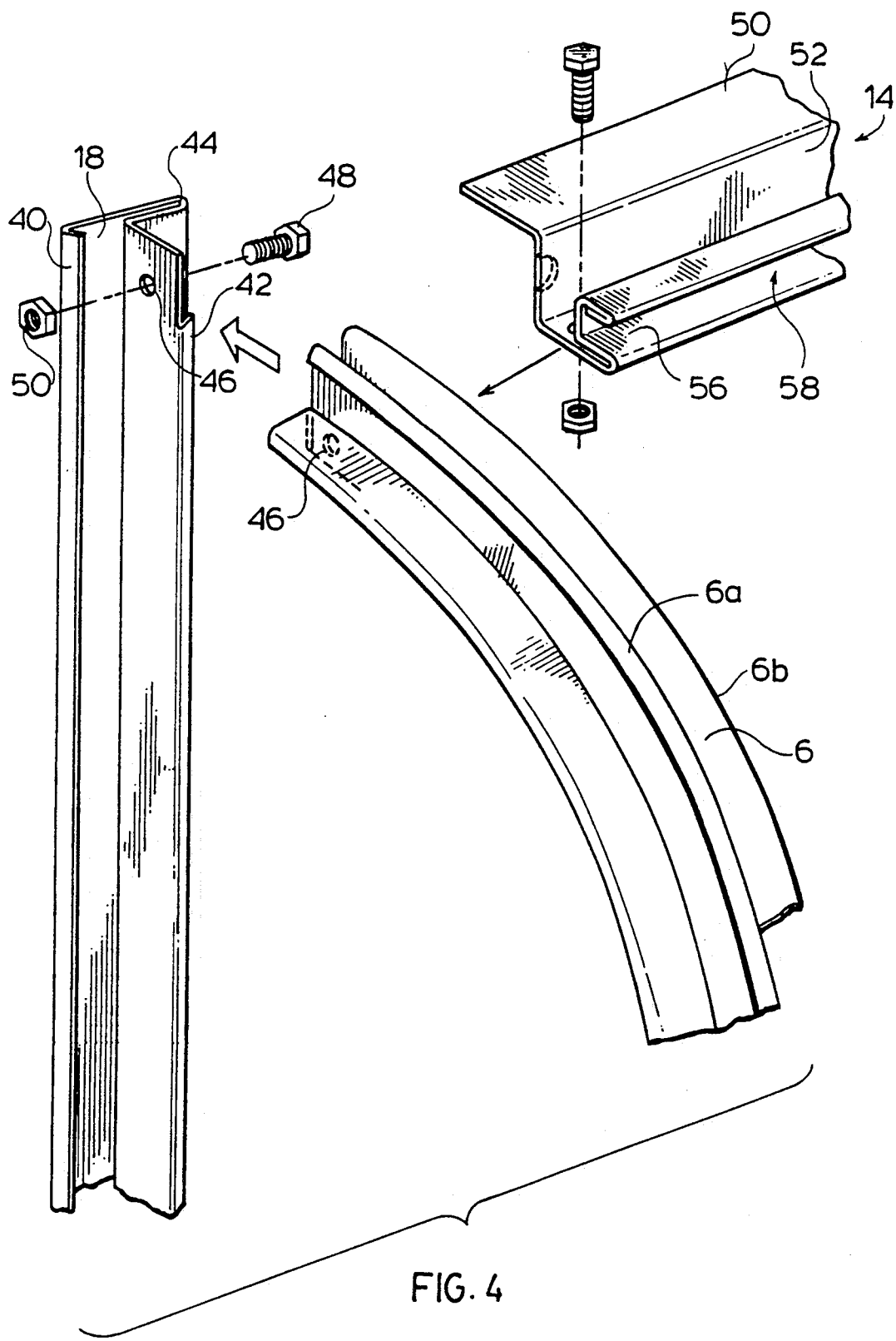
FIG. 4 is an exploded partial perspective view of connection of a number of components of the greenhouse assembly.
Figure 5:
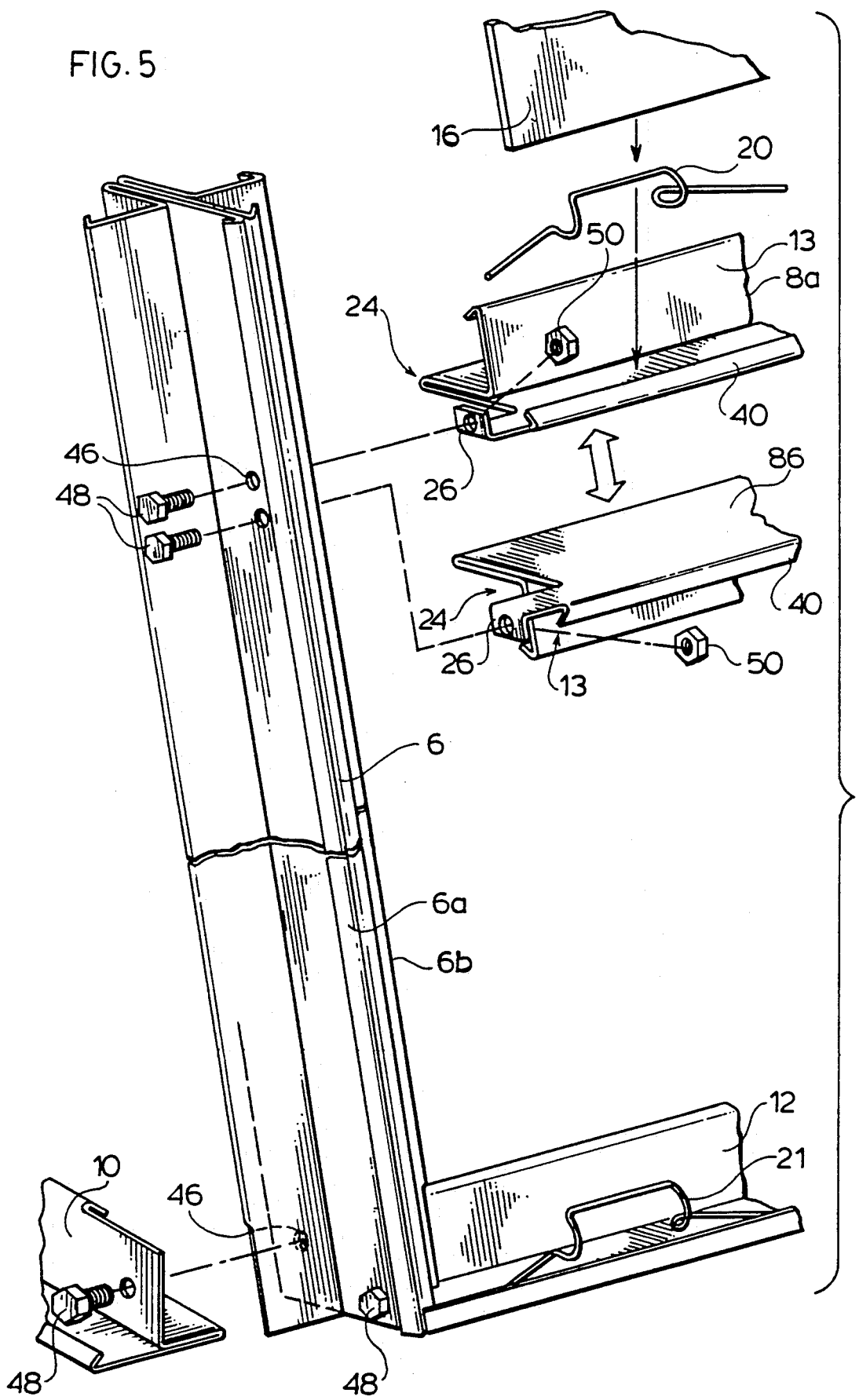
FIG. 5 is a perspective view showing connection of a number of structural members in the greenhouse assembly and securement of the cross members to an upright member.

Assembly of the framework of the greenhouse assembly can be appreciated from FIGS. 3 through 5. The upright members 6 each comprise components 6a and 6b having a common cross section the same as members 8a and 8b of the cross members, end members 10, bottom members 12, and rear upright member 18. Each of these structural members has the common T-shaped configuration with a downwardly and inwardly directing retaining flange 40 shown in FIG. 4 with an upwardly and inwardly directed retaining flange 42. These retaining flanges have an exterior angle of 120° defining an interior angle of about 60°. To the side of the web opposite retaining flange 42 the cross member of the 'T' is of a double thickness, generally shown as 44 in FIG. 4. This double thickness of the cross member of the 'T' is to one side of the web and is generally perpendicular thereto.

As can be seen, members 6a and 6b in FIG. 5 have been placed in back to back relationship and includes a number of ports generally shown as 46 used to receive connecting bolts 48 for securing one structural member to another. In FIG. 5, bolts 48 pass through both of the upright members 6a and 6b and engage cross members 8a and 8b having a bent flange 26 suitably ported to allow the bolts to pass through and effect a connection with nuts 50. Thus, the bolts 48 pass through the ports 46 in members 6a and 6b, through the ports provided in the bent flanges 26 and effect a connection with nuts 50 which tends to draw the cross members 8a and 8b into positive retention with the upright members 6a and 6b. The cross member 8 is again defined by the components 8a and 8b which are placed in back to back relationship much in the manner of the upright members 6a and 6b. In this case, the retaining flange 40 cooperates with the web 13 of the T configuration, with the web 13 providing support for the edge of the plexiglas panel shown as 16. A spring retaining clip 20 is engaged by the retaining flange 40 and exerts pressure on the plexiglas panel 16 maintaining engagement of the panel with the web 13. This would also be true for member 8b which would receive the upper edge of a panel.

FIG. 5 also illustrates the positive securement of bottom member 12 to the upright 6 by means of bolt 48 and end member 10 is also bolted to the structural member 6a and 6b via a bolt 48. Thus, a positive pin type mechanical securing arrangement is used for securing of the various structural members to avoid slippage and allow the bolts 48 to be load bearing members. Such a pin type pressure securing arangement avoids slippage and allows convenient assembly for the end user. For example, in a greenhouse kit assembly, the particular porting of the structural members and the use of bolts in combination with locking flanges or engaging flanges of the various structural members ensures that the kit is properly assembled, as there is no appreciable room for error due to the porting. As the structural members are all preferably of rolled steel, the porting is accomplished prior to the rolling operation. A further advantage of the system is that any curves which are necessary or desirable for the greenhouse assembly can be formed prior to joining of the structural members, such as 6a and 6b, whereby the press capacity is less. The double thickness of the T-shaped configuration when placed in back to back with a like member also stiffens the unit and adds appreciable rigidity. The greenhouse assembly 4 is typically defined by a structural member which is paired to form either an upright or a cross member, or can be used on its own as an end member 10 or bottom member 12. The notching of the end configurations of the cross members 8a and 8b is also easily accomplished due to the design of the structural member based on rolled steel, as the notching is carried out prior to the rolling operation.

As illustrated in FIG. 4, the securement of the upright member 6 to the rear upright member 18 is again by means of a bolt and nut connection 48 and 50 passing through appropriate ports 46 in the rear upright and upright members 6. The upright member 18 is preferably notched at the upper edge by removing a portion of retaining flange 42 to provide abutting contact at junction of 18 and 6. A similar notch is provided at the connection point with other members. The header member, generally shown as 14, is of a slightly different configuration and includes a first flange portion 50 to underlie the roof of the garden shed, a downward flange portion 52 which is generally perpendicular to flange 50, and an outwardly extending flange portion 56 having a plexiglas retaining edge generally shown as 58. Again, a nut and bolt arrangement is used to secure the header 14 to the upright 6 to one of the flanges of this member.

Figure 2:
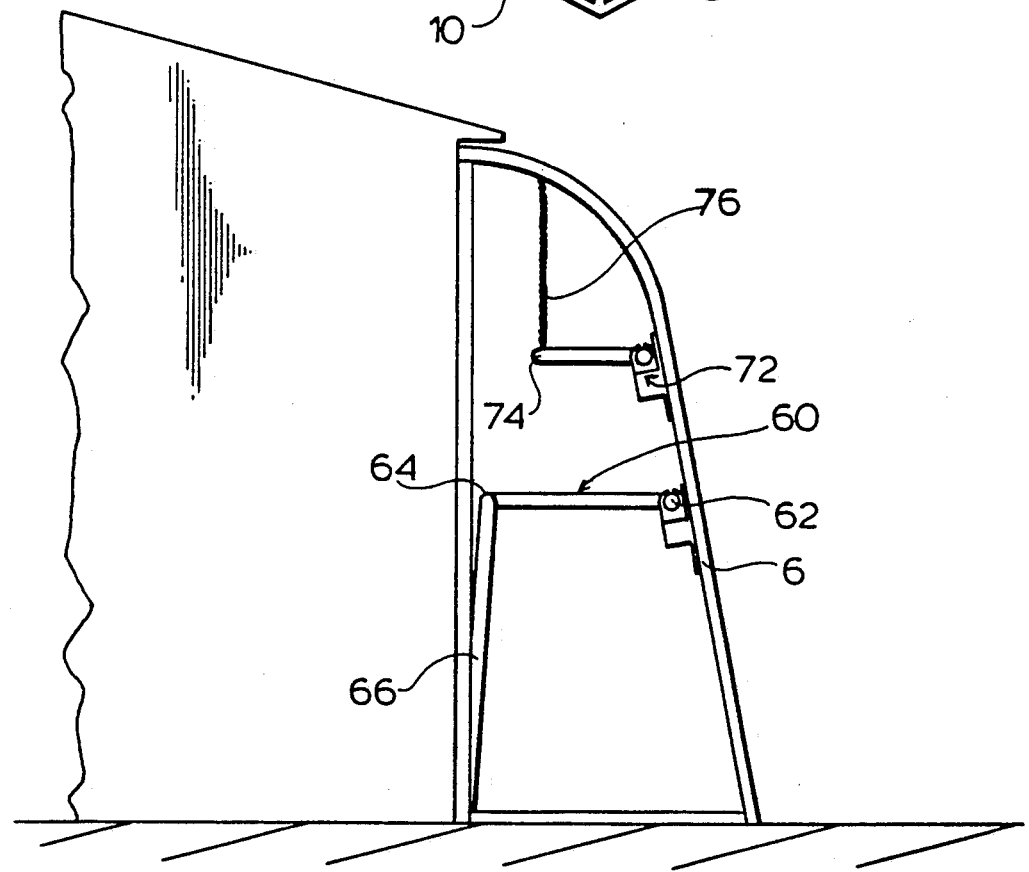
FIG. 2 is an end view of a portion of the garden shed and the greenhouse assembly.
Figure 6:
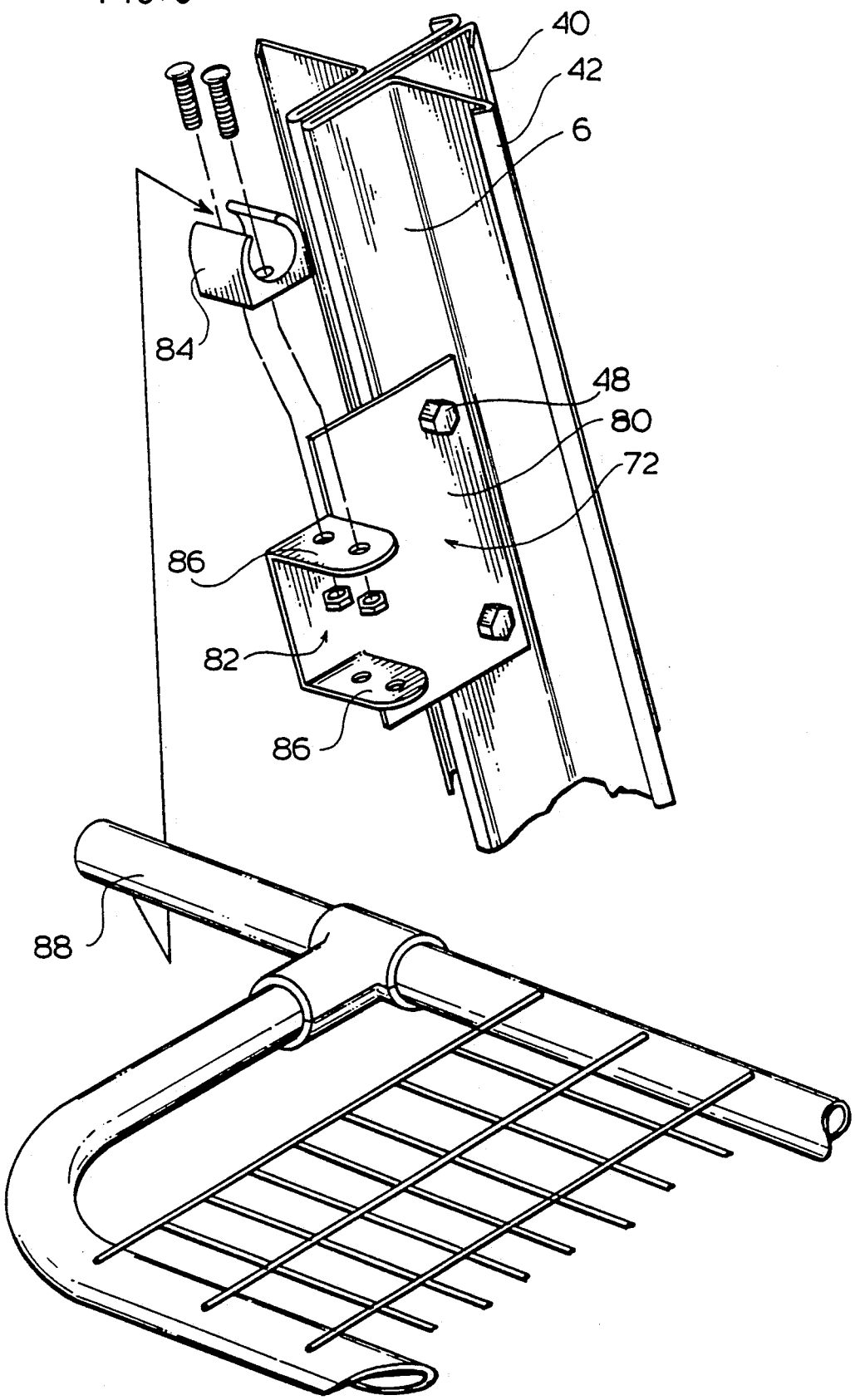
FIG. 6 shows securement of a shelving unit to a structural member of the greenhouse assembly.

A simplified shelving arangement for use in the greenhouse is also shown in FIGS. 2 and 6. In FIG. 2, a lower shelf assembly 60 has one end secured at 62 to the upright members 6, and the forward edge 64 of the shelf is supported by a leg arrangement generally shown as 66. Above the lower shelf assembly is an upper shelf assembly 70 secured by a bracket 72 to the upright member 6 and the forward edge of the shelf 74 is supported by a chain 76 to effectively suspend the forward edge 74. Details of the bracket 72, which is used for both the upper and lower shelf assembly, is shown in FIG. 6. It comprises a bracket member 80 bolted to the upright member 6 by means of bolts 48 with a U-shaped portion 82 at the forward edge for receiving the shelf engaging member 84. In this case, member 84 is directly secured to one of the arms 86 of the U-shaped portion 82. It can be appreciated that a lefthand and righthand bracket would normally be required, however, as two arms 86 are provided, this same bracket 72 may be used at the opposite end of the shelf with merely the shelf engaging member 84 secured to the opposite arm 86. Member 84 is designed for receiving the tubed portion 88 of the shelf in a snap-in type manner to facilitate initial placement of the shelf or removal of the shelf from the greenhouse.

With respect to the lower shelf assembly 60, the legs 66 are provided either end of the shelf and are pivotal relative to the horizontal plane of the shelf. The lower legs are received within the bottom member 12 to avoid any slippage. However, in the event that the shelf assembly 60 is not desired, the legs 60 may pivot about the forward edge 64 to effectively lower the shelf and place the legs in a position generally following the contour of the upright members 60. Thus, the horizontal part of the shelf in FIG. 2 would also be exposed approximate the front wall of the greenhouse assembly as would the legs 66, thus avoiding the necessity of completely removing the shelf as it effectively self-stores adjacent the forward wall.

A number of advantages are found in the present structure. The use of a rolled steel member is particularly advantageous with respect to a greenhouse assembly for use with a garden shed of steel. Most greenhouse assemblies use extruded aluminum and these two metals when brought together will form a galvanic cell resulting in the corrosion of the garden shed, particularly at the place of connection of the aluminum to the garden shed. By making the member of steel, not only is the manufacture less expensive, but it also is of the same material as a steel garden shed and thus, the corrosion due to different potentials of the material is reduced. The present fabrication, which effectively allows the pairing of a rolled steel structural member to form either an upright or a cross member, advantageously reduces the number of different structural members used in the greenhouse assembly and thus, further reduces the cost. By using a rolled steel member, prepunching is also possible and prenotching resulting in more positive securement and rendering the structure much more stable when attached to a suitable support.

Although the greenhouse assembly has been described with respect to use in association with a garden shed, it can be used with existing structures such as the side wall of a house, barn, etc., or it could be used in an entire greenhouse. The same advantages of economy of maufacturing due to reduced components, the ability to notch, bend and port the various components appropriately for connection, can be realized in an entire greenhouse and are not restricted to an add-on unit.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. In combination, two corresponding structural members, each structural member comprising a generally 'T' configuration at an upper side edge having a downwardly and inwardly directed retaining flange, the base of said 'T' configuration having to the side of said base opposite said retaining flange an upwardly and inwardly extending retaining flange, said structural members being held in back to back relation with the top portion of said 'T' configurations abutting to define a configuration generally symmetrical about the plane of said abutting top portions.

2. In combination as claimed in claim 1, wherein each structural member is appropriately ported to allow mechanical connection of said structural members.

3. In combination as claimed in claim 1, wherein each structural member is of rolled steel.

4. In combination as claimed in claim 3, wherein each structural member is bent to provide a smooth arc portion intermediate the length thereof.

5. In a greenhouse assembly having a number of upright members and a number of cross members mechanically secured to define frame network which receives and supports greenhouse panels, said upright members and said cross members each being based on a structural member comprising a generally 'T' configuration having, at an upper side edge, a downwardly and inwardly directed retaining flange, the base of said 'T' configuration having to the side of said base opposite said retaining flange an upwardly and inwardly extending retaining flange.

6. In a greenhouse assembly as claimed in claim 5, wherein said structural members as paired, placed in back to back relation to define a cross type configuration and secured.

7. In a greenhouse assembly as claimed in claim 6, wherein a number of said structural members are bent in an appropriate manner such that when paired with another bent structural member an upright member is formed which includes a curved portion.

8. In a greenhouse assembly as claimed in claim 7, wherein a majority of the members making up said frame network are single or paired structural members.

9. In a greenhouse as claimed in claim 2, wherein said structural members are of rolled steel.

10. In a garden shed an add-on greenhouse assembly having a number of upright members and a number of cross members mechanically secured to define a frame network which receives and supports greenhouse panels, said upright members and said cross members each being based on a structural member comprising a generally 'T' configuration, said upright members and said cross members being mechanically secured by positive engagement, each of said structural members being formed of a rolled steel material, said cross members each being defined by a pair of cooperating structural members secured in back to back relation defining a generally "+" configuration, said cross members including notched end portions with a securing flange bent generally perpendicular to the longitudinal axis of said structural member which forms part of the mechainical securement of the cross member to an upright member.

11. In a garden shed as claimed in claim 10, wherein each structural member includes, at an upper side edge, a downwardly and inwardly directed first retaining flange, the base of said 'T' configuration having to the side of said base opposite said first retaining flange an upwardly and inwardly extending second retaining flange.

12. In a garden shed as claimed in claim 11, wherein said upright members and said cross members are secured by nut and bolt fasteners where the bolt is placed in a load bearing relationship relative to said members and each bolt passes through a pair of members and in combination with a nut draws said member into a locked configuration.

13. In a garden shed as claimed in claim 11, wherein a number of said structural members are bent in an appropriate manner such that when paired with another bent structural member an upright member is formed which includes a curved portion.

14. In a garden shed as claimed in claim 10, wherein said upright members and said cross members are secured by nut an bolt fasteners where the bolt is placed in a load bearing relationship relative to said members and each bolt passes through a pair of members and in combination with a nut draws said member into a locked configuration, said cross members at the ends thereof including perpendicular flanges ported for receiving a bolt fastener securing said cross member to an upright member.

* * * * *